United States Patent
Willaert et al.

(10) Patent No.: US 11,843,324 B2
(45) Date of Patent: Dec. 12, 2023

(54) RESONANT INVERTER AND CONVERSION METHOD

(71) Applicant: SIGNIFY HOLDING B.V., Eindhoven (NL)

(72) Inventors: Jurgen Margriet Antonius Willaert, Nuenen (NL); Reinhold Elferich, Aachen (DE); Christian Hattrup, Wurselen (DE); Eric Hermanus Maria Remmerswaal, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 68 days.

(21) Appl. No.: 17/626,546

(22) PCT Filed: Jul. 14, 2020

(86) PCT No.: PCT/EP2020/069824
§ 371 (c)(1),
(2) Date: Jan. 12, 2022

(87) PCT Pub. No.: WO2021/009149
PCT Pub. Date: Jan. 21, 2021

(65) Prior Publication Data
US 2022/0247325 A1  Aug. 4, 2022

(30) Foreign Application Priority Data
Jul. 15, 2019 (EP) .................... 19186198

(51) Int. Cl.
*H02M 7/48* (2007.01)
*H02M 1/00* (2006.01)
(Continued)

(52) U.S. Cl.
CPC ....... *H02M 7/4815* (2021.05); *H02M 1/0003* (2021.05); *H02M 1/0025* (2021.05);
(Continued)

(58) Field of Classification Search
CPC .. H02M 1/4241; H02M 3/01; H02M 3/33571; H02M 3/33573; H02M 7/4815; H02M 1/0025; H02M 1/0003
See application file for complete search history.

(56) References Cited

U.S. PATENT DOCUMENTS

| 5,448,466 A | 9/1995 | Erckert |
| 2014/0091718 A1 | 4/2014 | Brinlee |

(Continued)

FOREIGN PATENT DOCUMENTS

| EP | 3414824 A1 | 12/2018 |
| JP | 2016052161 A | 4/2016 |
| WO | 2017137342 A1 | 8/2017 |

OTHER PUBLICATIONS

Zhiyuan Hu, et al., "Bang-Band Charge Control for LLC Resonant Converters", IEEE Transactions on Power Electronics, vol. 30, No. 2, Feb. 2015, pp. 1093-1108.

(Continued)

*Primary Examiner* — Alex Torres-Rivera (57) ABSTRACT

A resonant inverter for a resonant converter, comprising a switch network and a resonant tank circuit. The switch network is controlled by a control circuit, which is responsive to a sampled electrical feedback parameter provided by the resonant tank circuit. The value of the sampled electrical feedback parameter or the time of sampling the electrical feedback parameter is modified in response to a measured time delay between the control circuit indicating a desire to change a switching state of the switch network, and the output of the switch network responding to this desire.

15 Claims, 5 Drawing Sheets

(51) Int. Cl.
H02M 1/42    (2007.01)
H02M 3/00    (2006.01)
H02M 3/335   (2006.01)

(52) U.S. Cl.
CPC ......... *H02M 1/4241* (2013.01); *H02M 3/01* (2021.05); *H02M 3/33571* (2021.05); *H02M 3/33573* (2021.05)

(56) References Cited

U.S. PATENT DOCUMENTS

| | | |
|---|---|---|
| 2014/0098574 A1 | 4/2014 | Hara et al. |
| 2016/0065075 A1* | 3/2016 | Sugahara ............ H02M 1/4225 363/21.02 |
| 2017/0223792 A1 | 8/2017 | Elferich et al. |
| 2019/0044433 A1 | 2/2019 | Elferich et al. |
| 2020/0195160 A1* | 6/2020 | Mayell .............. H02M 3/33592 |

OTHER PUBLICATIONS

Takamichi Umetsu, et al., "Design of A2DOF Controller for LLC Current-Resonant DC-DC Converters with Delay Time", IEEE, 2015, pp. 1-6.

* cited by examiner

RESONANT INVERTER AND CONVERSION METHOD

CROSS-REFERENCE TO PRIOR APPLICATIONS

This application is the U.S. National Phase application under 35 U.S.C. § 371 of International Application No. PCT/EP2020/069824, filed on Jul. 14, 2020, which claims the benefit of European Patent Application No. 19186198.8, filed on JUL. 15, 2019. These applications are hereby incorporated by reference herein.

FIELD OF THE INVENTION

The present invention relates to the field of resonant inverters, and in particular to resonant inverters for use in a resonant converter.

BACKGROUND OF THE INVENTION

Resonant inverters are an essential component of a resonant converter. Although a typical use of resonant converters is to perform DC-DC conversion, there is an increasing interest in adapting resonant converters to perform AC-DC, or even AC-AC, conversion.

US 2014/0091718 A1 proposes the use of an LLC DC/DC converter, preceded by a rectifier, as a PFC circuit. This effectively provides a resonant converter that is used to perform AC-DC conversion. In this document, it is described how the resonant converter is frequency controlled using an oscillator. The control value of the feedback control system is the resonant inverter's switching frequency.

EP 3414824 A1 describes how an operation of a resonant converter can be controlled using an electrical feedback parameter. The electrical feedback parameter may comprise a voltage across a capacitor of an LLC circuit (i.e. a resonant tank circuit). The electrical feedback parameter may be taken at a switching instant of a gate drive signal that controls a switching operation.

Thus, it is known to provide self-oscillating resonant converters that make use of internal components to form a resonant tank, and use signal values (e.g. voltage levels which arise in the circuit) to control switching operations.

There is an ongoing desire to improve the operation of resonant converters, and in particular, to improving the power factor of a resonant converter when it acts as Power Factor Corrector (PFC).

SUMMARY OF THE INVENTION

The invention is defined by the claims.

According to examples in accordance with an aspect of the invention, there is provided a resonant inverter. The resonant inverter comprises: an input node for receiving an input for conversion; a switch network, connected to the input node, comprising at least a first and second switch, wherein a first switch output is defined from a node located between the first and second switches; a resonant tank circuit coupled to the first switch output, wherein an electrical feedback parameter is provided by the resonant tank circuit; a sampling circuit adapted to sample the electrical feedback parameter provided by the resonant tank circuit at a time of sampling; a control circuit for generating a switch drive signal in dependence of the sampled electrical feedback parameter, the switch drive signal indicating a desired switching state for the first and second switches; a switch driver adapted to control the switching state of the first and second switches responsive to the gate drive signal, wherein a change in the switching state of the first and second switches induces a change in the first switch output; and a timing module adapted to monitor one or more other components of the resonant inverter to determine a time delay between a change in the switch drive signal and a corresponding change in the first switch output, wherein the time of sampling is dependent upon the change in the switch drive signal and the sampling circuit is adapted to adjust the time of sampling and/or a value of the sampled electrical feedback parameter dependent upon the time delay.

The inventors have recognized that a (propagation) time delay in the switch driver and/or in the switch network itself causes a delay between the switch drive signal indicating a desire to switch and the actual switching of an output of the switch network. This means that a sampled electrical feedback parameter (which is typically sampled at the time that the switch drive signal changes) does not accurately reflect the electrical feedback parameter at the more desirable time when the first switch output changes. This reduces the PFC performance of the resonant inverter. There is therefore a need to obtain a value desired sample, being a sample of the electrical feedback parameter at a time when the first switch output changes.

The inventors have also identified that the length of this time delay differs depending upon characteristics of the resonant inverter, and in particular, a received input voltage. Thus, the inventors have recognized that to accurately obtain the desired sample of the electrical feedback parameter (at the time the switches actually change switching state) it is necessary to accurately determine a length of the time delay.

The inventors overcome this problem by monitoring components of the resonant inverter, using a timing module, to determine a length of this time delay, and modify characteristics of the sampling accordingly (e.g. a time of sampling or the value of the sample), to thereby effectively obtain the desired sample of the electrical feedback parameter.

The timing module may be adapted to directly measure a time delay between a change in the switch drive signal and a corresponding change in the first switch output, e.g. by directly monitoring the switch drive signal and the first switch output. In other embodiments, the timing module may be able to infer the timing delay, e.g. based upon the voltage of an input received at the input node and/or a voltage of the output (e.g. at the time of sampling).

The electrical feedback parameter may comprise a voltage across a capacitor of the resonant tank circuit. A resonant tank circuit typically comprises at least one capacitor and at least one inductor, and the inventors have recognized that a voltage across the capacitor can be used to appropriately control the resonant tank circuit. Examples of suitable resonant tank circuits include LC resonant tank circuits, LLC resonant tank circuit, LLCC resonant tank circuits and so on.

The sampling circuit may be adapted to set the time of sampling to be equal to the sum of the time at which there is a change in the switch drive signal and the time delay.

Preferably, the time of sampling is dependent upon a falling edge of the gate drive signal.

The resonant inverter may further comprise a peak measuring module adapted to determine a peak value of the electrical feedback parameter, wherein the sampling circuit is adapted to adjust the value of the sampled electrical feedback parameter dependent upon the time delay and the determined peak value of the amplitude of the electrical feedback parameter.

By modifying a previously sampled voltage in this manner, the electrical feedback parameter is sampled by the sampling circuit at a moment in time when no switching action is presently taking place in the resonant inverter. Thus, there are no disturbances that could affect the value of the electrical feedback parameter (e.g. noise or current injection). This improves an accuracy of the sampled voltage.

The timing module may comprise a slope detection circuit, adapted to detect a slope in the first switch output, and a timer adapted to time a difference between the change in the switch drive signal and a corresponding slope in the first switch output.

In other embodiments, the timing module comprises an input monitoring circuit adapted to determine a voltage of an input received at the input node and calculate a time delay based on the determined voltage of the input.

According to some embodiments, the first switch is a first high side switch and the second switch is a first low side switch, and the first and second switches are connected in series between the input node and a ground or reference voltage.

The resonant inverter may be adapted so that: the switch network further comprises a third switch, being a second high side switch, and a fourth switch, being a second low side switch, connected in series between the input node and the ground or reference voltage, wherein a second switch output is defined from a node located between the third and fourth switches; and the resonant tank circuit is connected between the first switch output and the second switch output. Thus, the switch network may be a full-bridge (FB) switch network.

There is proposed an AC/DC PFC resonant inverter, comprising: an AC input; an AC rectifier adapted to rectify the AC input to provide the input for conversion; and any herein described resonant inverter.

There is also proposed an LED driver, comprising: any previously claimed resonant inverter, and an isolation transformer at the first switch output of the resonant tank circuit, wherein the secondary side of the isolation transformer is for driving an LED load.

A primary side of the isolation transformer can act as an inductor for the resonant tank circuit, as is known in the art.

There is also proposed a conversion method comprising: receiving, at an input node, an input for conversion; operating a switch network, connected to the input node, comprising at least a first and second switch, wherein a first switch output is defined from a node located between the first and second switches; providing an electrical feedback parameter from a resonant tank circuit coupled to the first switch output; sampling the electrical feedback parameter provided by the resonant tank circuit at a time of sampling; generating a switch drive signal in dependence of the sampled electrical feedback parameter, the switch drive signal indicating a desired switching state for the first and second switches; controlling the switching state of the first and second switches responsive to the gate drive signal, wherein a change in the switching state of the first and second switches induces a change in the first switch output; and ,determining a time delay between a change in the switch drive signal and a corresponding change in the first switch output, wherein the time of sampling is dependent upon the change in the switch drive signal and the step of sampling the electrical feedback parameter comprises adjusting the time of sampling and/or a value of the sampled electrical feedback parameter dependent upon the time delay.

In embodiments, the electrical feedback parameter comprises a voltage across a capacitor of the resonant tank circuit.

The step of sampling preferably comprises setting the time of sampling to be equal to the sum of the time at which there is a change in the switch drive signal and the time delay.

The method may further comprise determining a peak value of the electrical feedback parameter, wherein the step of sampling comprises adjusting the value of the sampled electrical feedback parameter dependent upon the time delay and the determined peak value of the amplitude of the electrical feedback parameter.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a resonant inverter for a resonant converter, comprising a switch network and a resonant tank circuit. The switch network is controlled by a control circuit, which is responsive to a sampled electrical feedback parameter provided by the resonant tank circuit. The value of the sampled electrical feedback parameter or the time of sampling the electrical feedback parameter is modified in response to a measured time delay between the control circuit indicating a desire to change a switching state of the switch network, and the output of the switch network responding to this desire.

The invention relies on the recognition that, for improved power factor correction, it is desirable for a control circuit to be responsive to a change in the output of the switch network. However, the inventors have recognized that it is difficult to measure and respond a change in the output of the switch network, as this change may be extremely small, e.g. with a low voltage rail. It is herein appreciated that (a value of) the desired sample can be obtained by modifying a response (e.g. time of sampling or value of a sample) of a sampling circuit based on a measured time delay.

Embodiments may be used, for example, for driving an LED arrangement, or any other element desiring a consistent DC output, with good power factor properties from an AC source.

Figure 1:
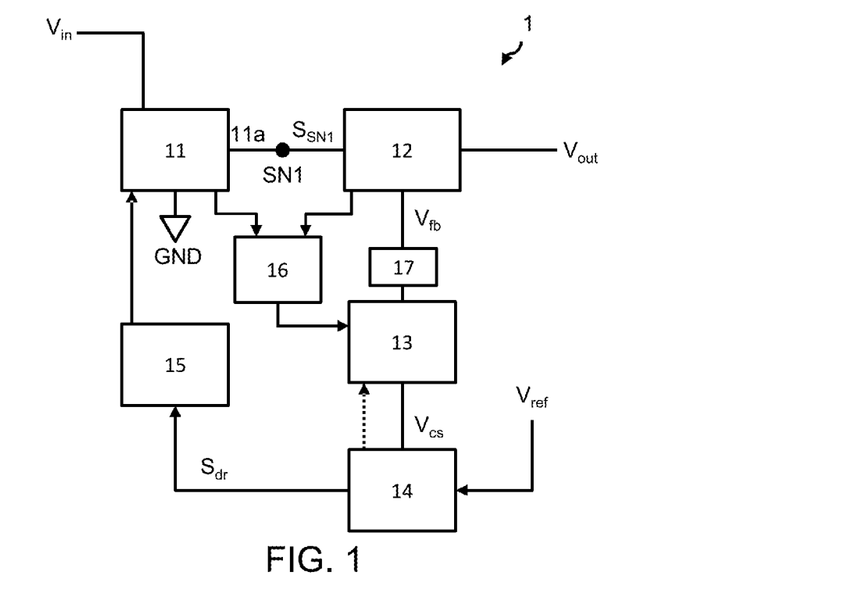
FIG. 1 illustrates a resonant inverter according to an embodiment of the invention.

FIG. 1 is a block diagram illustrating a resonant inverter 1 according to an embodiment of the invention.

The resonant inverter 1 comprises a switch network 11 and a resonant tank circuit 12. The switch network 11 and the resonant tank circuit 12 together receive an input $V_{in}$ for conversion, and generate an alternating current (AC) output $V_{out}$. The resonant tank circuit 12 also provides an electrical feedback parameter $V_{fb}$, such as a feedback voltage. The electrical feedback parameter provides information on the alternating current (AC) output $V_{out}$, and may comprise a voltage across a capacitor of the resonant tank circuit 12.

Suitable embodiments for a switch network 11 and a resonant tank converter 12 are well known in the prior art, although a suitable embodiment will be described later.

Generally speaking, the switch network 11 provides an output 11a, at a first switch output node SN1, to the resonant tank converter 12 that is used, by the resonant tank converter, to generate the alternating current (AC) output $V_{out}$. The output 11a at the first switch output node SN1 is switched, by the switch network, between the voltage at the input $V_{in}$ and a ground or reference voltage GND.

Similarly, the resonant tank converter typically comprises an LLC circuit, and may be otherwise known as an LLC tank converter.

A sampling circuit 13 obtains a sample $V_{cs}$ of the electrical feedback parameter $V_{fb}$ ("sampled feedback parameter"). This is performed at a time of sampling. Methods of obtaining a sample of a feedback parameter are well known to the skilled person, as are components or circuits capable of obtaining such a sample.

The sampling circuit 13 may aim to repeatedly sample the electrical feedback parameter $V_{fb}$, e.g. each time a switch of the switch network moves from a closed state to an open state or vice versa.

The resonant inverter further comprises a control circuit 14 that controls the operation of the switch network 11 (i.e. of the switches within the switch network). The control circuit 14 is responsive to the sample $V_{cs}$ of the electrical feedback parameter $V_{fb}$ obtained by a sampling circuit 13. The control circuit 14 generates a switch drive signal $S_{dr}$ for controlling the operation of the switch network 11.

The switch drive signal $S_{dr}$ is controllably between a "high" state and a "low" state (e.g. 5V/3.3V and 0V respectively, although other values are considered). The low state indicates a desire for the output at the first switch output node to be equal to the input $V_{in}$ and the high state indicates a desire for the output at the first switch output node SN1 to be equal to the ground/reference voltage (or vice versa).

By way of example, the electrical feedback parameter $V_{fb}$ may be compared to a reference feedback parameter $V_{ref}$ (e.g. a reference voltage) and used to control a frequency or time period of the switch drive signal $S_{dr}$ (and therefore a frequency or time period of the switching performed by the switch network 11). As would be known to the skilled person, controlling the frequency of the switching controls a voltage/current provided to a load driven by a resonant converter containing the resonant inverter, i.e. the parameters of the alternating current output $V_{out}$.

Other methods of controlling a switch network 11 responsive to an electrical feedback parameter, such as the voltage across a capacitor of the resonant tank circuit 12, are well known in the prior art. EP 3414824 A1 is one example of a document that describes a suitable control method.

As the sampling circuit 13 may repeatedly or iteratively sample the electrical feedback parameter, so the control circuit may repeatedly or iteratively control the operation of the switch network (i.e. to provide a feedback loop system).

The control circuit 14 controls the operation of the switch network via a switch driver 15. In particular, the control circuit 14 controls a conductivity of switches of the switch network in order to define a switching period of the switch network. The switch driver 15 comprises the necessary components to drive the switching of switches within the switch network. The switch driver 15 may comprise, for example, level shifters and gate drivers.

The time of sampling (i.e. the time at which the sampling circuit 13 samples the electrical feedback parameter $V_{fb}$) is dependent upon a change in the switch drive signal $S_{dr}$, e.g. a switch from a high state to a low signal. By way of example, the sampling circuit 13 may sample the electrical feedback parameter in response to detecting an edge of the switch drive signal $S_{dr}$.

More specifically, the sampling circuit 13 may sample the electrical feedback parameter $V_{fb}$ in response to detecting an edge of the switch drive signal $S_{dr}$ as it instructs the switch network to switch a voltage at the first switch output node from a ground/reference voltage GND to the input voltage $V_{in}$.

In another example, the sampling circuit 13 may sample the electrical feedback parameter in response to detecting an edge of the switch drive signal $S_{dr}$ as it instructs the switch network to switch a voltage at the first switch output node from the input voltage $V_{in}$ to a ground/reference voltage GND.

However, the present inventors have recognized the desire for the sample of the electrical feedback parameter $V_{fb}$ to be obtained in response to a change in the output of the switch network (i.e. a change in the voltage at the first switch output node SN1). This enables the control circuit to dynamically adapt the switching frequency of the switch network in a cycle-by-cycle manner. This improves the power factor of the overall resonant inverter.

In particular, the control circuit can be adapted to control the switch network so that a plot of the (corrected) sampled Vcs voltages over time yields a perfect (positive) sinusoidal waveshape. This may be performed with reference to a mains AC input, e.g. so that a frequency of the plot of the sampled Vcs voltages matches the frequency of the mains input. Since these sampled feedback parameters represent amplitudes of energy (current) drawn from mains, this in turn means sinusoidal input currents, as desired to fulfil PF requirements.

If the control circuit instead relied upon the sampled value of the electrical feedback parameter at the time of switching the switch drive signal $S_{dr}$, then the operation of the control circuit will be based on an erroneous feedback parameter. By accurately determining the feedback parameter at the time that the actual value output of the control circuit switches, than the power factor of the resonant inverter can be improved by appropriate control by the control circuit.

It is not desirable to sample the electrical feedback parameter directly in response to a change in the output of the control circuit because the input $V_{in}$ may be close to zero (e.g. if the input signal $V_{in}$ is simply a rectified input from a mains AC supply). This would make it difficult to detect the slope of a change in the output of the control circuit from ground to $V_{in}$ (as the change may be imperceptible when the input signal $V_{in}$ is close to zero).

There are a couple of reasons it is desirable to sample the electrical feedback parameter to reflect a value when the change in the output of the switch network (at SN1) is performed.

Firstly, the change in the output of the switch network marks an internal resonant tank circuit state transition that relates to energy transferred by the resonant tank circuit to its output. Thus, by obtaining a value of the feedback parameter reflecting the time at which the node SN1 changes, a better, more precise control of energy transfer is obtained which translates in a better tracking of (i.e. control with respect to) mains input for improved PFC (e.g. compared to obtaining the value of the feedback parameter when switch drive signal $S_{dr}$ changes).

Moreover, the signal amplitude of $V_{fb}$ when the switch drive signal $S_{dr}$ changes may be lower as compared to a time at which the value at the node SN1 changes. Specifically around zero-crossings of mains, the $V_{fb}$ voltage when the switch drive signal changes is so close to zero, and sometimes might even go negative, which makes it more difficult to measure. An offset in the $V_{fb}$ sense/measurement circuit can be added in order to be able to measure negative values. Thus, one can expect more errors, e.g. due to disturbances in low amplitudes/measurement errors due to offset or the like. Sampling at the time at which the value at node SN1 changes (i.e. the switching element respond to the switch drive signal $S_{dr}$) has fewer of the aforementioned drawbacks, i.e. $V_{fb}$ signal amplitudes are larger, are not going negative, and will likely result in a more accurate measured input signal which feeds the controller than the same signal sampled at the time that the switch drive signal $S_{dr}$ changes.

There is therefore a problem of how to accurately obtain a value of the electrical feedback parameter at a time when the output of the control circuit switches (e.g. from a ground voltage GND to the input voltage $V_{in}$).

The present inventors have solved this problem by determining a value of the time delay during operation of the resonant inverter. This enables cycle-by-cycle correction of the sampled feedback parameter, providing a more accurate feedback parameter for controlling the operation of the switch network.

The inventors have also recognized that the delay time Tdelay changes as a function of magnitude of the electrical feedback parameter $V_{fb}$, which is in turn dependent upon a magnitude of the input voltage $V_{in}$ provided to the resonant inverter. For lower input voltage $V_{in}$ this delay is smaller than for the higher input voltages. By determining the time delay during operation of the resonant inverter, the present (variable) value of the time delay can be obtained, and thereby used to more accurately control the switching of the switch network.

A timing module 16 is adapted to determine a time delay between the control circuit 14 outputting the switch driver signal $S_{dr}$ and the output provided by the switch network 11 responding to the switch driver signal $S_{dr}$. This delay is caused by, for example, a propagation delay through the switch driver 15 and/or (parasitic) capacitances in the switch network 11 or resonant tank circuit 12 slowing a response of the output provided by the switch network to a change in the switch driver signal $S_{dr}$. These delays will be explained in more specific detail later.

The timing module 16 monitors components or parameters of the resonant inverter in order to determine the time delay, of which suitable embodiments will also be later described. An example of a parameter of the resonant inverter is the voltage present at node SN1.

The sampling circuit 13 is adapted to modify the value of the obtained sample or the time of sampling responsive to a value of the time delay determined by the timing module. This is performed with the intent of obtaining a value equivalent or representing the value of the electrical feedback parameter at a time at which the output of the switch network 11 has responded to the change in the switch driver signal $S_{dr}$ (i.e. taking the time delay into account).

In other words, it is understood that a time delay can be variable so that a sampling circuit can be dynamically adapted to respond to a variation in the time delay.

In a simple embodiment, the time of sampling may be delayed by the determined time delay, so that the electrical feedback parameter is sampled when the switch drive signal $S_{dr}$ has responded to the change in the switch driver signal $S_{dr}$.

In another embodiment, the value of the sampled feedback parameter $V_{cs}$ is modified by a voltage change value $dV_{cs}$ (e.g. they are summed) to obtain a value representing the value of the electrical feedback parameter at a time at which the output of the switch network has responded to the change in the switch drive signal $S_{dr}$. The voltage change value $dV_{cs}$ is responsive to the time delay.

The voltage change value $dV_{cs}$ may be calculated using the following equation:

$$dV_{cs} = T_{delay} \cdot \frac{\pi \cdot V_{cs\_peak}}{T_{s\_ctrl}} \quad (1)$$

where $T_{delay}$ represented the determined time delay, $V_{cs\_peak}$ represents the peak value of the electrical feedback parameter and $T_{s\_ctrl}$ represents the switching period of the switch network (which is controlled by the control circuit 14).

The inverter 1 may further comprise a peak measuring module 17 adapted to determine a peak (i.e. maximum) value of the electrical feedback parameter. Suitable examples of peak measuring modules will be well known to the skilled person.

By modifying a previously sampled voltage in this manner, the electrical feedback parameter is sampled by the sampling circuit at a moment in time when no switching action is presently taking place in the resonant inverter. Thus, there are no/negligible disturbances that could affect the value of the electrical feedback parameter (e.g. noise or current injection). The sampled feedback parameter can then be compensated for using the additional inputs (e.g. the peak value of the electrical feedback parameter and the switching period) to thereby modify the sampled value so that it reflects a value of the electrical feedback parameter as if it were sampled at the delayed target moment in time that coincides with rising edge at the first switch input node SN1 (which may otherwise have disturbances). In this way, a clean feedback parameter is obtained for the target moment in time and with the correct level.

In other words, the proposed method provides a sampled feedback parameter that reflects a sample of the electrical feedback parameter at a point at which the output of the switch network changes.

The sampling circuit 13 and the control circuit 14 may be integrated into the same component, e.g. a micro-controller or microprocessor.

It is possible that the timing module 16 may fail to determine the time delay between a most recent change in the switch drive signal and a change in the output of the switch network. This may occur, for example, when the voltage magnitude of $V_{in}$ is extremely low or zero (which would result in the output of the switch network also being extremely low or zero) and slope detection of the output of the switch network fails.

In this case, the most recently obtained time delay (e.g. in a previous cycle of the switching) may be used to modify a time of sampling or the value of the sampled electrical feedback parameter.

Figure 9:
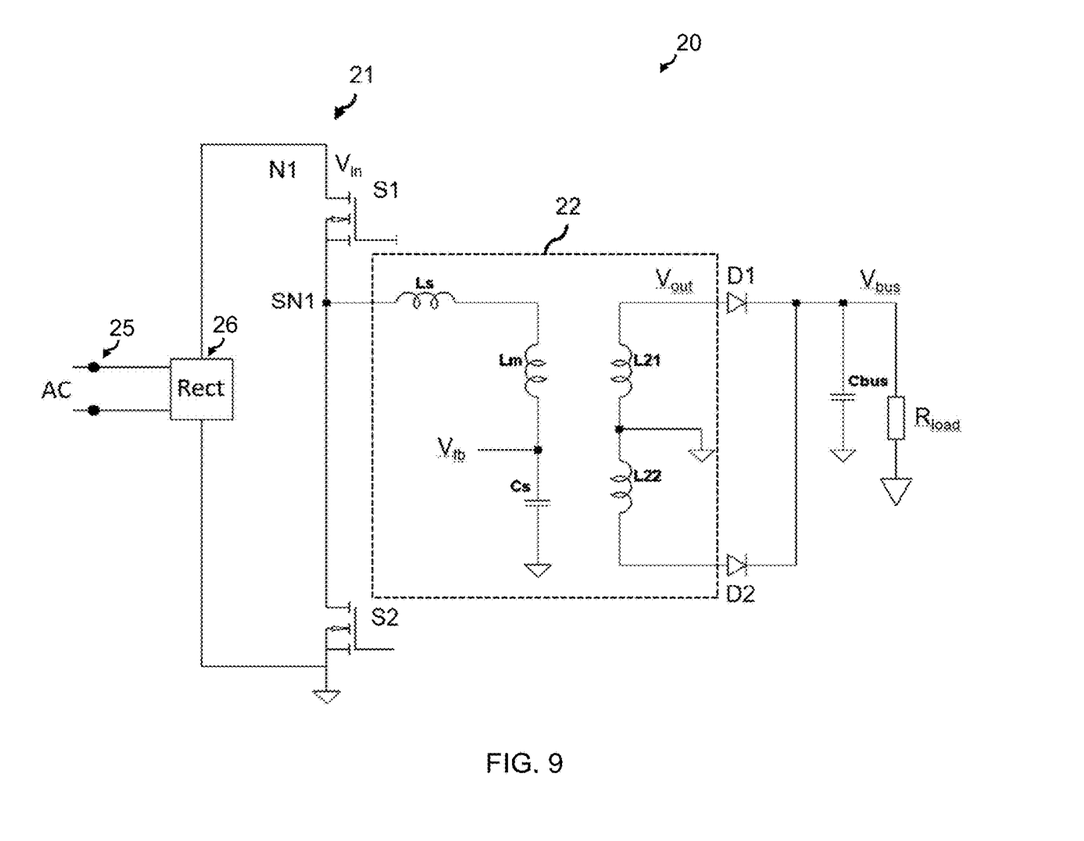
FIG. 9 illustrates a resonant inverter comprising an AC input and an AC rectifier, according to an embodiment of the invention.

FIG. 9 is a circuit diagram illustrating a switch network 21 and a resonant tank circuit 22, in the context of a resonant converter 20. The resonant converter 20 may further comprise an AC input 25 and an AC rectifier 26. The AC input 25 may, for example, comprise a connection for connecting to a mains supply. The AC rectifier 26 rectifies a signal provided by the AC input 25 for provision as the input $V_{in}$ to the resonant inverter.

Figure 2:
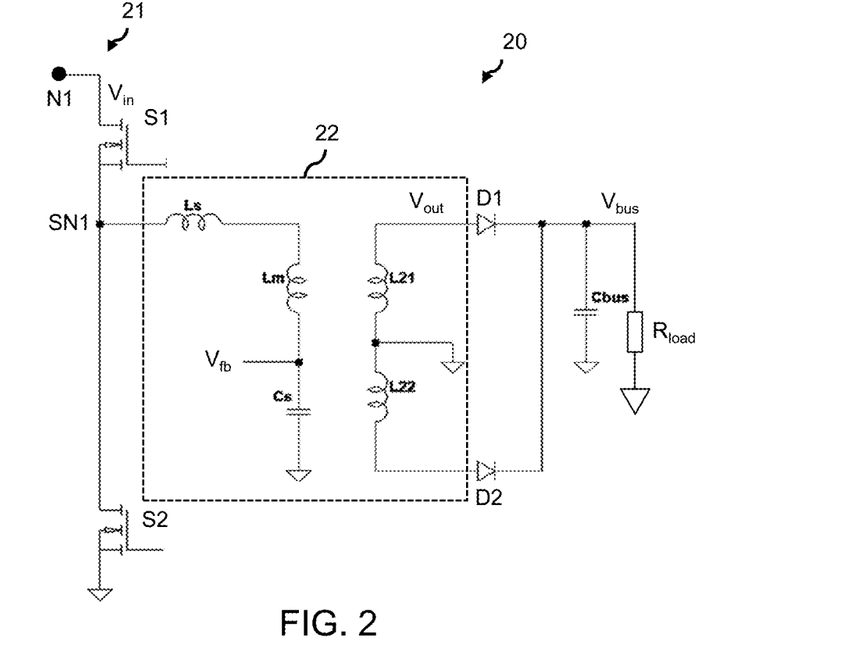
FIG. 2 illustrates a resonant inverter, for a resonant converter, according to an embodiment of the invention.

FIG. 2 is a circuit diagram illustrating a switch network 21 and a resonant tank circuit 22, in the context of a resonant converter 20, for use in an embodiment of the invention. FIG. 2 illustrates further components of the resonant converter 20 for providing a DC output $V_{bus}$ using the alternating current output $V_{out}$ by the resonant tank circuit 22.

Although the operation of the resonant converter 20 will be readily understood by the skilled person, for improved clarity a brief description will be hereafter provided.

The switch network 21 comprises a first switch S1 and a second switch S2 connected in series between the input voltage $V_{in}$ (provided at an input node N1) and a ground or reference voltage GND. The first switch Si is therefore a first high side switch and the second switch S2 is therefore a first low side switch. A first switch output node SN1 provides an output for the resonant tank circuit.

The operation of the first switch S1 and second switch S2 is controlled by a control circuit (not shown), e.g. via a switch driver (also not shown), as would be well known to the skilled person.

The resonant tank circuit 22 is an LLC tank circuit, although other examples are envisaged. The resonant tank circuit here comprising a resonant inductor Ls and a resonant capacitor Cs connected in series to form a series resonant tank Ls, Cs. The resonant tank circuit 22 also comprises a transformer, formed from a first/primary side inductor Lm (connected in series with the resonant inductor Ls and resonant capacitor Cs) and a second/secondary side inductor (formed as two sub-inductors L21, L22). The resonant inductor Ls, resonant capacitor Cs and first side inductor Lm form the LLC circuit of the LLC tank circuit, as is well known in the art. The term "inductor" is here used synonymously with the term "winding", as would be appreciated by the skilled person.

The current induced in the second side inductor L21, L22 by the first side inductor Lm (i.e. the alternating signal output by the resonant tank circuit) is rectified by an output rectifier D1, D2. Here, the output rectifier is a center-tapped output rectifier with full-wave rectification, although this may be replaced by a bridge rectifier (for which no center-tapping is required—i.e. the second side inductor L21, L22 can be one continuous inductor).

The rectified output is smoothed by a smoothing capacitor $C_{bus}$ to thereby provide a substantially DC voltage for powering a load $R_{load}$. The load $R_{load}$ may, for example, comprise an LED arrangement, e.g. formed of one or more strings or one or more LEDs.

It should be noted that the load $R_{load}$ may be resistive (as illustrated). However, the skilled person will appreciate that other load types could be used as the load $R_{load}$, for example, a second switched-mode converter connected to a further resistive load (such as a buck converter having an LED load connected to its output), which effectively acts as a constant power load. Other loads types might include a constant current load or a constant voltage load.

The skilled person will appreciate that the configuration of the switch network 21, the resonant tank circuit 22, the output rectifier D1, D2 and the smoothing capacitor $C_{bus}$ means that the series resonant tank Ls, Cs and load $R_{load}$ (connected to $V_{bus}$) effectively together act as a voltage divider.

The impedance of the resonant tank Ls, Cs will change in response to a change in frequency of the signal provided at the first switch output node SN1, which itself is responsive to a switching frequency of the first Si and second switch S2. Thus, the control circuit (not shown) can control a voltage/current output to the load $R_{load}$ by adjusting a switching frequency of the switch network (i.e. the first and second switches).

Typically, the switch network 21 is operated so that the duty cycle of the signal at the first switch output node SN1 is approximately 50%. It is also known for a control circuit to introduce a predetermined delay (otherwise known as "non-overlap time" or "deadtime") between switching the first switch and switching the second switch (when changing a value at the first switch output node SN1) to prevent the input $V_{in}$ from shorting to the ground/reference voltage GND.

Effectively, FIG. 2 illustrates a typical or known example of a half-bridge series resonant inverter. Other suitable resonant inverters will be known to the skilled person, such as a full-bridge series resonant inverter, a half-bridge parallel resonant inverter and a full-bridge parallel resonant inverter.

The voltage across the resonant capacitor Cs of the resonant tank circuit 22 can act as the electrical feedback parameter $V_{fb}$. The control circuit can track this voltage in order to provide a smooth oscillating current through the resonant tank circuit, e.g. matching a mains current, to improve a power factor of the overall resonant converter. Such steps would be known to the skilled person.

Figure 3:
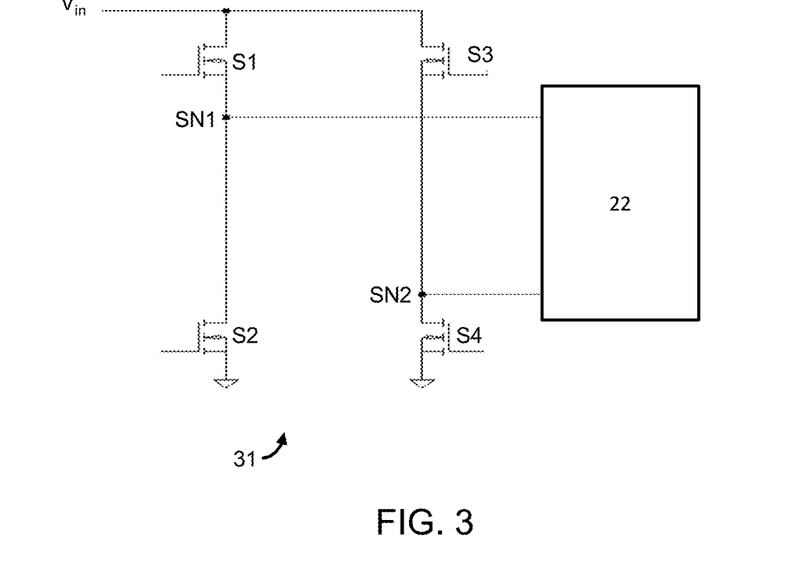
FIG. 3 illustrates an alternating switch network for a resonant inverter according to an embodiment of the invention.

FIG. 3 illustrates an alternative embodiment of a switch network 31, e.g. to replace the switch network 21 illustrated in FIG. 2.

The switch network differs from the previously described switch network by further comprising a third switch S3, being a second high side switch, and a fourth switch S4, being a second low side switch, connected in series between the input node N1 (providing the input voltage $V_{in}$) and the ground or reference voltage GND. A second switch output SN2 is defined from a node located between the third and fourth switches.

The resonant tank circuit 22 is then connected between the first switch output SN1 and the second switch output SN2. The voltage across the resonant capacitor Cs can still act as the electrical feedback parameter $V_{fb}$.

Effectively, FIG. 3 illustrates a typical or known example of a full-bridge series resonant inverter.

Figure 4:
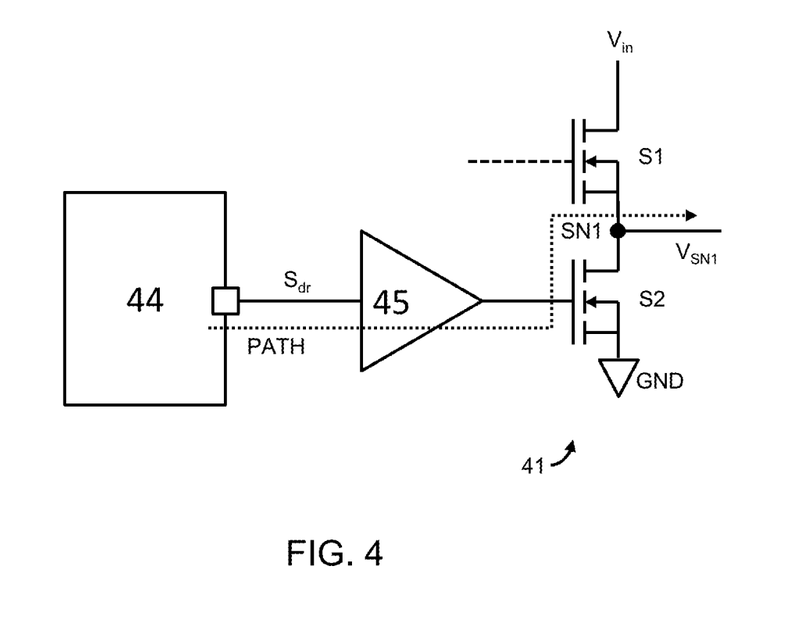
FIG. 4 illustrates, in component form, a delay between a change in a switch drive signal and a response of an output of the switch network to the change in the switch drive signal.

FIG. 4 illustrates a control circuit 44, switch driver 45 and switch network 41 for improved understanding a cause of a time delay between changing of a switch drive signal $S_{dr}$ and the response of the output $V_{SN1}$ of the switch network 41.

The switch network 41 here comprises a first switch S1 and second switch S2 connected in series between an input node N1 and a ground or reference voltage GND. A first switch output node SN1 is defined between the first and second switches.

The switch drive signal $S_{dr}$ has a propagation delay path from the output of the control circuit through the switch driver and switch S2 to the first switch output node SN1. Thus, the response at the first switch output node is delayed compared to the output of the instruction to perform a switching action "open" depends upon the momentary amplitude of resonant tank current $I_{SN1}$ and the (parasitic) capacitance value CSN1 of any capacitor(s) connected to node SN1, according to the following equation:

$$\frac{dV_{SN1}}{dt} = \frac{I_{SN1}}{C_{SN1}} \qquad (2)$$

The $C_{SN1}$ capacitance value may be part parasitic (e.g. as part of the drain-source capacitances of both S1 and S2) and/or part physically present as an (externally) placed capacitor at node SN1 (not shown and not essential).

Because the slope of $V_{sn1}$ is therefore not constant over time (due to the momentary amplitude of resonant tank current $I_{SN1}$), a different "delay" can be observed, e.g. for "steep slopes" this delay is smaller as compared to more "gentle slopes".

An additional, intentional delay may be introduced by introducing a delay between a control signal for the first switch S1 and a control signal for the second switch S2. This delay may be provided to prevent the input $V_{in}$ from being connected to the ground/reference voltage GND via the first and second switches. However, it is noted that this delay will not be present between the switch drive signal $S_{dr}$ and the corresponding change in the output if the switch drive signal $S_{dr}$ changes after the corresponding control signal for the other switch is generated.

As previously noted, the sampling of the electrical feedback parameter $V_{fb}$ is performed in response to a change in a desired conductivity of a switch of the switch network, i.e. the switch drive signal $S_{dr}$.

Figure 5:
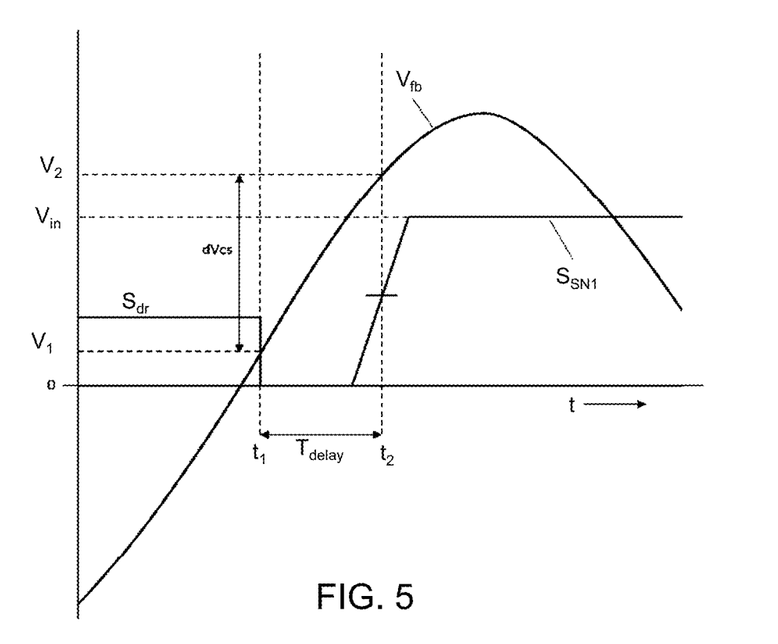
FIG. 5 illustrates, in graphical form, a delay between a change in a switch drive signal and a response of an output of the switch network to the change in the switch drive signal.

FIG. 5 illustrates a time delay $T_{delay}$ between changing of the switch drive signal $S_{dr}$ and the changing of the signal $S_{SN1}$ at the first switch output node SN1. FIG. 5 also plots the electrical feedback parameter $V_{fb}$ over this period of time.

It can be seen that the switch drive signal $S_{dr}$ changes at a time $t_1$, and the voltage at the first switch output node SN1 changes at a later time $t_2$ (this change being defined as occurring at 50% of a slope). Thus, there is a time delay $T_{delay}$, equal to $t_2-t_1$. This results in there being a significant difference dVcs between the electrical feedback parameter at a time that the signal $S_{SN1}$ changes and a time at which an instruction $S_{dr}$ to change the first switch output node is issued. The difference dVcs is the difference between the voltage $V_2$ of the electrical feedback parameter $V_{fb}$ at the point when the signal $S_{SN1}$ changes and the voltage of $V_1$ of the electrical feedback parameter $V_{fb}$ at the point when the switch drive signal $S_{dr}$ changes.

It has previously been explained how the delay time Tdelay changes as a function of magnitude of the electrical feedback parameter $V_{fb}$, which is in turn dependent upon a magnitude of the input voltage $V_{in}$ provided to the resonant inverter. For lower input voltages $V_{in}$, this delay is smaller than for the higher input voltages.

The input voltage $V_{in}$ may not be a constant voltage source. For example, the input voltage $V_{in}$ may be a rectified mains voltage (i.e. vary as a function of time). Thus, the magnitude of the input voltage $V_{in}$ may vary as a function of time (synchronously with the mains voltage). This means that the delay time Tdelay would change over time, for different values of $V_{in}$. Embodiments therefore preferably continuously update the calculated delay time.

Figure 6:
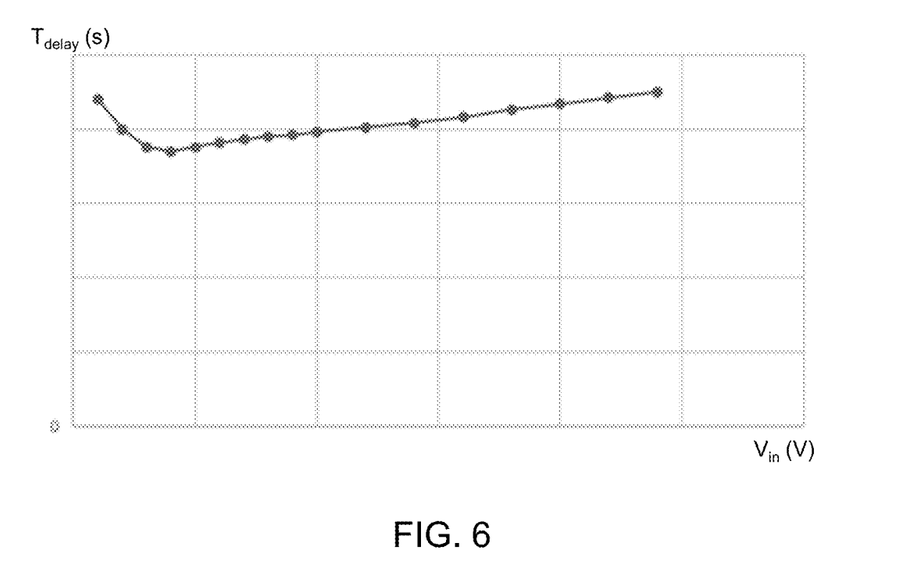
FIG. 6 illustrates a relationship between input voltage, to a resonant inverter, and a length of a delay between instructing a change in a switch configuration and the response of the output to the instruction.

FIG. 6 is a diagram illustrating a determined relationship between the magnitude of the input voltage $V_{in}$ (x-axis, measured in volts) and the length of the time delay $T_{delay}$ (y axis, measured in seconds). It can be seen how, at low input voltages, the time delay is initially high, dropping at mid-range voltages before rising again at high-range voltage.

It will be understood that, if the relationship between magnitude of the input voltage and the length of the time delay is known, then the length of the time delay $T_{delay}$ can be determined by directly measuring the magnitude of the input voltage $V_{in}$ and applying a function to the measured magnitude.

Thus, although not illustrated, the timing module may comprise an input monitoring circuit adapted to determine a voltage of an input received at the input node and calculate a time delay based on the determined voltage of the input.

Figure 7:
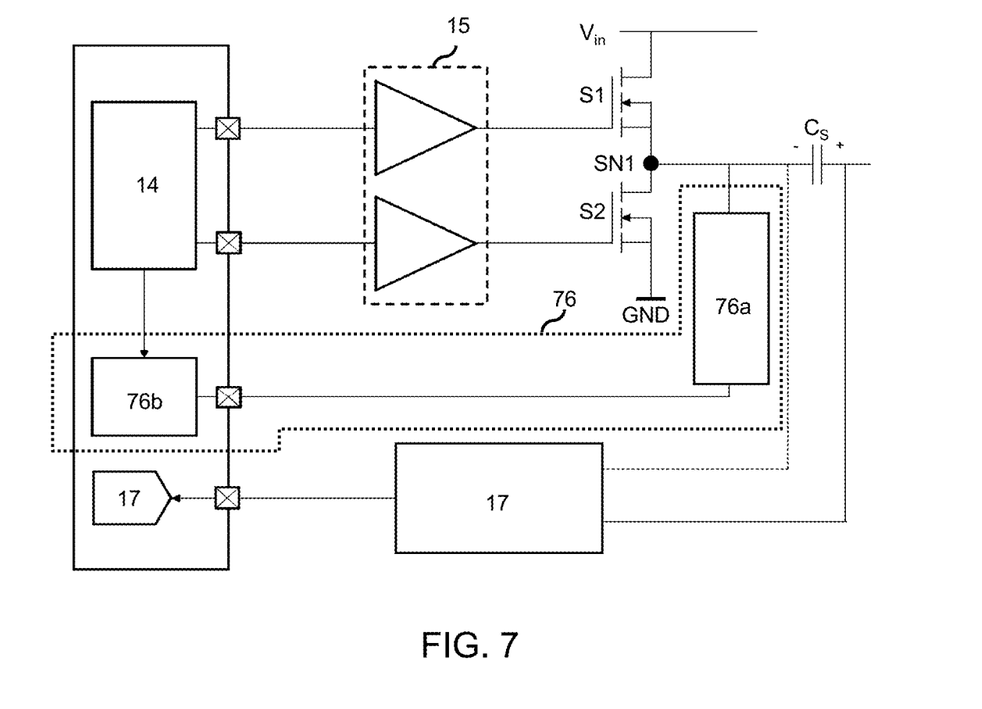
FIG. 7 illustrates components of a resonant inverter, including a timing module for determining a length of the delay.

FIG. 7 illustrates a timing module 76 for use in an embodiment of the invention. The timing module 76 is illustrated in the context of other components of the resonant inverter.

The timing module 76 comprises a slope detection circuit 76a adapted to detect a slope in the voltage at the first switch output node SN1 and generate a slope signal $S_{slope}$ responsive to the detected slope.

The timing module 76 further comprises a timer 76b adapted to time a difference between the time at which the switch drive signal instructs a change (generated by the control circuit 14) and the time at which the detected slope is detected. The time at which the switch drive signal instructs a change in the first switch output node will be known from the control circuit 14. For example, the control circuit may generate a trigger for the timer 76b at a point in which it changes the switch drive signal $S_{dr}$.

The timing module 76 thereby effectively determines the time delay through direct measurement.

FIG. 7 also illustrates the peak measuring module 17 for capturing a maximum value of the electrical feedback parameter.

In one simple example, where the electrical feedback parameter is a voltage signal, the peak measuring module may comprise a diode and a large capacitor (e.g. ~100 pf) connected in series between the electrical feedback parameter and a ground/reference voltage. The anode of the diode may be connected to the electrical feedback parameter, with the cathode being connected to one side of the large capacitor. A voltage across the capacitor would thereby be equal to the peak value of the electrical feedback parameter.

Other suitable examples will be apparent to the skilled person, e.g. a processor adapted to iteratively sample the electrical feedback parameter and select a largest sampled value of the electrical feedback parameter as the maximum value of the electrical feedback parameter. This approach may be preferred for improved accuracy.

Thus, the peak measuring module 17 can be implemented using analog or digital components.

In any foregoing embodiments, different elements may be distributed or implemented using different components of the resonant converter/inverter. For example, a single microprocessor may contain some or all elements of the control circuit, sampling circuit and timing module.

Figure 8:
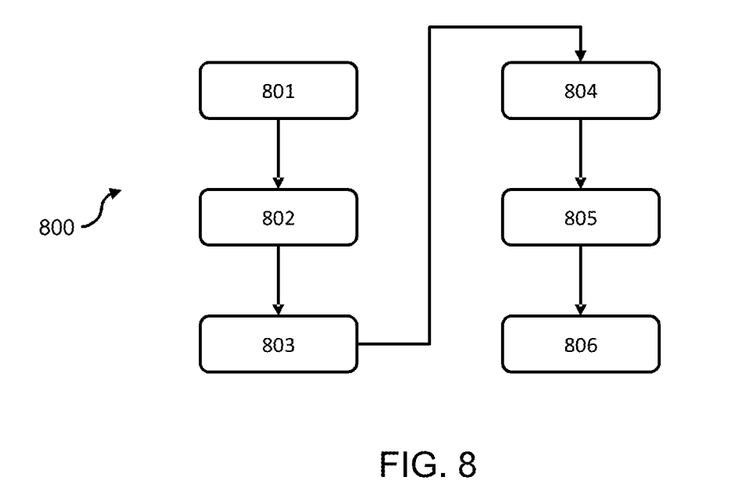
FIG. 8 illustrates a method according to an embodiment of the invention.

FIG. 8 illustrates a conversion method 800 according to an embodiment.

The conversion method 800 comprises a first step 801 of receiving, at an input node, an input for conversion.

The conversion method 800 further comprises a second step 802 of operating a switch network, connected to the input node, comprising at least a first and second switch, wherein a first switch output is defined from a node located between the first and second switches.

The conversion method 800 further comprises a second step 802 of providing an electrical feedback parameter from a resonant tank circuit coupled to the first switch output.

The conversion method 800 further comprises a third step 803 of sampling the electrical feedback parameter provided by the resonant tank circuit at a time of sampling.

The conversion method 800 further comprises a fourth step 804 of generating a switch drive signal in dependence of the sampled electrical feedback parameter, the switch drive signal indicating a desired switching state for the first and second switches.

The conversion method 800 further comprises a fifth step 805 of controlling the switching state of the first and second switches responsive to the gate drive signal, wherein a change in the switching state of the first and second switches induces a change in the first switch output.

The conversion method 800 further comprises a sixth step 806 of determining a time delay between a change in the switch drive signal and a corresponding change in the first switch output.

The time of sampling is dependent upon the change in the switch drive signal and the step of sampling the electrical feedback parameter comprises adjusting the time of sampling and/or a value of the sampled electrical feedback parameter dependent upon the time delay.

The skilled person would be readily capable of adapting the above-described method to appropriately perform conversion to carry out any herein described concept, e.g. as described with reference to FIGS. 1 to 7.

The skilled person would be readily capable of developing a processing system for carrying out any herein described method. Thus, each step of the flow chart may represent a different action performed by a processing system, and may be performed by a respective module of the processing system.

Embodiments may therefore make use of a processing system. The processing system can be implemented in numerous ways, with software and/or hardware, to perform the various functions required. A processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media such as volatile and non-volatile computer memory such as RAM, PROM, EPROM, and EEPROM. The storage media may be encoded with one or more programs that, when executed on one or more processors and/or processing systems, perform the required functions. Various storage media may be fixed within a processor or processing system or may be transportable, such that the one or more programs stored thereon can be loaded into a processor or processing system.

It will be understood that disclosed methods are preferably computer-implemented methods. As such, there is also proposed the concept of computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A resonant inverter, comprising:
an input node for receiving an input voltage for conversion;
a switch network, connected to the input node, comprising at least a first and second switches coupled in series, wherein a first switch output is defined from a node located between the first and second switches;

a resonant tank circuit coupled to the first switch output and adapted to output an alternating signal, wherein an electrical feedback parameter is provided by the resonant tank circuit;
a sampling circuit adapted to sample the electrical feedback parameter provided by the resonant tank circuit at a time of sampling;
a control circuit for generating a switch drive signal in dependence of the sampled electrical feedback parameter, the switch drive signal indicating a switching state for the first and second switches;
a switch driver adapted to control the switching state of the first and second switches responsive to a gate drive signal, wherein a change in the switching state of the first and second switches induces a change in the first switch output; and
a timing module adapted to monitor at least a voltage at the node of the resonant inverter to determine a time delay between a change in the switch drive signal and a corresponding change in the first switch output,
wherein the time of sampling is dependent upon the change in the switch drive signal and the sampling circuit is adapted to adjust the time of sampling and/or a value of the sampled electrical feedback parameter dependent upon the time delay.

2. The resonant inverter as claimed in claim 1, wherein the electrical feedback parameter comprises a voltage across a capacitor of the resonant tank circuit.

3. The resonant inverter as claimed in claim 1, wherein the sampling circuit is adapted to set the time of sampling to be equal to a sum of the time at which there is a change in the switch drive signal and the time delay.

4. The resonant inverter as claimed in claim 1, wherein the time of sampling is dependent upon a falling edge of the gate drive signal.

5. The resonant inverter as claimed in claim 1, further comprising a peak measuring module adapted to determine a peak value of the electrical feedback parameter, wherein the sampling circuit is adapted to adjust the value of the sampled electrical feedback parameter dependent upon the time delay and the determined peak value of an amplitude of the electrical feedback parameter.

6. The resonant inverter of claim 1, wherein the timing module comprises a slope detection circuit, adapted to detect a slope in the first switch output, and a timer) adapted to time a difference between the change in the switch drive signal and a corresponding slope in the first switch output.

7. The resonant inverter of claim 1, wherein the timing module comprises an input monitoring circuit adapted to determine a voltage of an input received at the input node and calculate a time delay based on the determined voltage of the input.

8. The resonant inverter of claim 1, wherein the first switch is a first high side switch and the second switch is a first low side switch, and the first and second switches are connected in series between the input node and a ground or reference voltage.

9. The resonant inverter of claim 8, wherein:
the switch network further comprises a third switch, being a second high side switch, and a fourth switch, being a second low side switch, connected in series between the input node and the ground or reference voltage, wherein a second switch output is defined from a node located between the third and fourth switches; and
the resonant tank circuit is connected between the first switch output and the second switch output.

10. An AC/DC PFC resonant inverter, comprising:
an AC input;
an AC rectifier adapted to rectify the AC input to provide the input for conversion; and
the resonant inverter as claimed in claim 1.

11. A resonant converter comprising:
the resonant inverter of claim 1; and
an output rectifier adapted to rectify the alternating signal output by the resonant tank circuit.

12. A conversion method, comprising:
receiving, at an input node, an input for conversion;
operating a switch network, connected to the input node, comprising at least a first and second switches, wherein a first switch output is defined from a node located between the first and second switches;
providing an electrical feedback parameter from a resonant tank circuit coupled to the first switch output;
sampling the electrical feedback parameter provided by the resonant tank circuit at a time of sampling;
generating a switch drive signal in dependence of the sampled electrical feedback parameter, the switch drive signal indicating a switching state for the first and second switches;
controlling the switching state of the first and second switches responsive to a gate drive signal, wherein a change in the switching state of the first and second switches induces a change in the first switch output; and
determining a time delay between a change in the switch drive signal and a corresponding change in the first switch output,
wherein the time of sampling is dependent upon the change in the switch drive signal and wherein sampling the electrical feedback parameter comprises adjusting the time of sampling and/or a value of the sampled electrical feedback parameter dependent upon the time delay.

13. The method as claimed in claim 12, wherein the electrical feedback parameter comprises a voltage across a capacitor of the resonant tank circuit.

14. The method as claimed in claim 12, wherein the step of sampling comprises setting the time of sampling to be equal to a sum of the time at which there is a change in the switch drive signal and the time delay.

15. The method as claimed in claim 12, further comprising determining a peak value of the electrical feedback parameter,
wherein the step of sampling comprises adjusting the value of the sampled electrical feedback parameter dependent upon the time delay and the determined peak value of an amplitude of the electrical feedback parameter.

* * * * *